April 28, 1936.   G. W. LAMPMAN ET AL   2,039,009
GROMMET OR THE LIKE
Filed Feb. 1, 1935

Inventors
George W. Lampman
& Grant F. Cooper
By Blackmore, Spencer & Hush
Attorneys Patented Apr. 28, 1936

2,039,009

UNITED STATES PATENT OFFICE 2,039,009

GROMMET OR THE LIKE

George W. Lampman and Grant F. Cooper, Pontiac, Mich., assignors to General Motors Corporation, Detroit, Mich., a corporation of Delaware Application February 1, 1935, Serial No. 4,589

9 Claims. (Cl. 285—30)

This invention relates to grommets and particularly to resilient ferrules of rubber or other elastic deformable material, such as are used generally for various purposes, including the sealing of the space between two parts, one of which projects through an opening in the other, the avoidance of rattles, the insulation of parts, the elimination of the need for accurately fitted parts and oftentimes merely for improved appearance.

It is an object of the invention to provide an improved and inexpensive grommet construction by which a snug fit and a neat assembly is insured, even though the parts to which the grommet is applied have an irregular surface contour.

A further object is to provide a simplified design of grommet whereby it can be easily and quickly installed, and which in its application automatically conforms to or assumes the shape of and tightly contacts under elastic stress with the parts with which it is associated.

Figure 1:
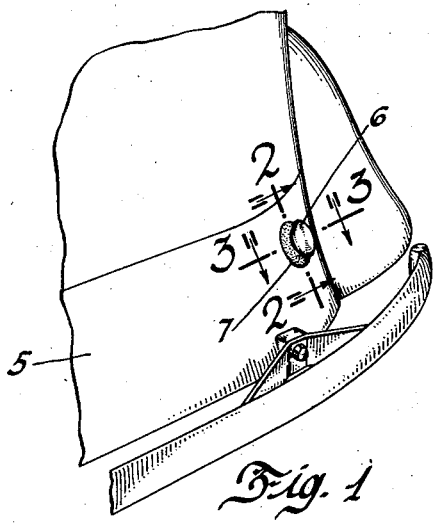
Figure 2:
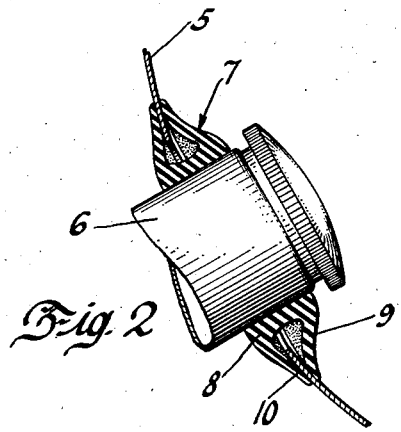
Figure 4:
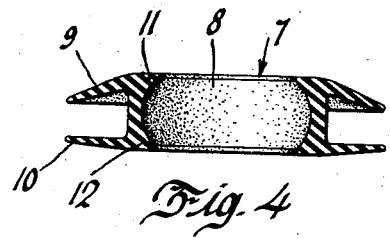
Figure 3:
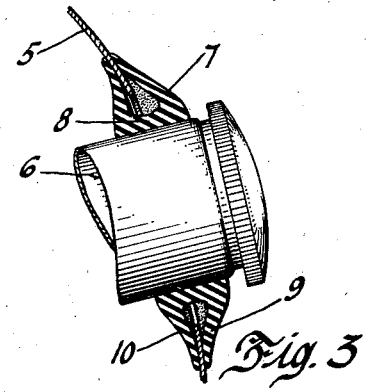
Figure 5:
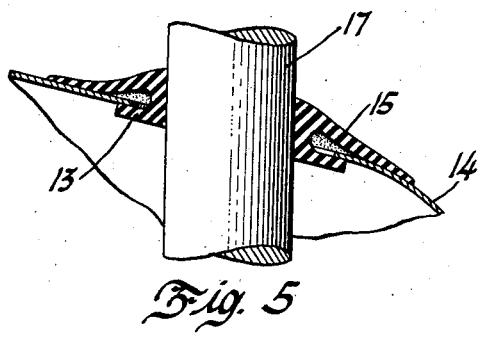
Figure 6:
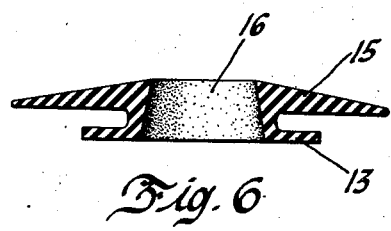

Other objects and advantages will become apparent during the course of the following specification having reference to the accompanying drawing in which Figure 1 shows in perspective the rear portion of an automobile with the grommet applied at the filler neck of the fuel tank; Figures 2 and 3 are detail sectional views taken on lines 2—2 and 3—3, respectively, of Figure 1; Figure 4 is a detail sectional view of the grommet prior to its installation; Figure 5 is a sectional view of a modified form of grommet and Figure 6 shows in section the unattached grommet of Figure 5.

For the sake of disclosure the grommet will be referred to hereinafter as installed on the gasoline tank filler neck, but it should be understood that it has a wide field of usefulness and may be applied generally to various types of construction in which an inner member projects through an opening in an outer member.

In present day automobile design the gasoline tank is usually mounted at the rear of the chassis frame and concealed beneath the body. The filler neck projects from the tank and through either a fender or one of the body panels. In the drawing the numeral 5 indicates a sheet metal panel and the numeral 6 a filler spout assembly projecting through an opening in the panel. Closing the open space between the edge of the panel 5 and the spout 6, is the grommet 7, preferably of rubber or other relatively soft elastic material, and comprising a collar 8 closely fitted to the spout with upper and lower flanges 9 and 10 projecting peripherally from the collar in spaced apart relation to overlap and receive therebetween the edge portion of the panel 5.

The grommet may be formed or molded to the shape illustrated in Figure 4 where the flanges or projections 9 and 10 are shown as extending outwardly at opposite ends of the collar or ring 8 in outwardly converging or slightly inclined relation to one another, providing therebetween an annular groove. The central opening through the grommet has an irregular or varying diameter being of largest size in the zone of the groove and of smaller size diametrically near opposite ends in the planes of the two flanges. This provides near opposite ends of the openings a pair of internal ribs or ridges 11 and 12 with an intervening valley therebetween, and the collar or ring 8 may be considered as being formed near opposite ends with internal and external projections or conversely with annular grooves intermediate its ends on both the inside and outside thereof.

When the grommet described is applied to an inner member whose diameter substantially coincides with the largest inside diameter of the collar a displacement of the material, particularly at the internal beads, occurs and the collar snugly embraces and conforms to the shape of the inner member to which it is applied. This displacement of the material and expansion of the central opening tends to bend the collar in the zone of the groove and constrict the size of the groove by moving the rim portions of the two flanges toward each other and into contact with the edge portion of the outer panel. The deformation is illustrated by the positions of the parts in Figures 2 and 3. These figures also show that, inasmuch as the peripheral projections are flexible, they conform to the surface contour of the panel regardless of its irregularities, it being noted that the panel 5 in the plane of line 2—2 in Figure 1 is inwardly concave, while in the plane of line 3—3 it is bowed outwardly or convex in shape. For better appearance the flanges and particularly the outer flange 9 taper outwardly and present a feather-edge which serves to avoid abrupt breaks in surface contour and causes the outer surface of the grommet to merge smoothly into the surface of the panel.

In those cases where the underside of the panel is always concealed from view and appearance is no object, the feather-edging of the innermost flange may be omitted, as illustrated in Figure 5. Here the inner flange 13 overlaps the edge of the panel 14 just a sufficient amount to locate the collar while the outer flange 15 overlaps to a greater extent and merges into the surface contour as before described. This modification is calculated to decrease slightly the cost of manufacture. As a further modification the central openings for the grommet may omit one of the internal beads, in which case the deformation is principally at one end to move the outermost flange for constricting the size of the groove. Since it is necessary merely to have an excess of material or an internal enlargement in the opening, this may conveniently be provided by making the central opening of frusto-conical shape as at 16 in Figure 6, which results in the deformation illustrated in Figure 5 where the collar is applied to the central member 17.

From the above description it will be apparent that there is afforded a construction whereby the grommet, when installed, by reason of its elasticity and deformation of parts, maintains close fitting engagement with the parts to which it is applied.

We claim:

1. A closure device for the opening in a sheet member through which another member projects, said closure device comprising a rubber collar to fit snugly the last mentioned member, a pair of spaced internal ribs and a pair of spaced external flanges in the zones of the ribs adapted to receive therebetween the edge portion of the opening in said sheet member.

2. An appearance element for use between an outer member and an inner member projecting into an opening in the outer member, said element having a flexible feather-edge flange to overlap the exterior surface of the outer member, and a deformable collar carrying said flange and surrounding the inner member, said collar extending beyond the flange through said opening and carrying an outward projection for engagement with the underside of the outer member, the internal diameter of the collar tapering in size and being smallest in the zone of said flange whereby a snug fit on the inner member deforms the collar and moves the flange axially toward the projection into engagement with the outer member so that the flexible flange conforms and merges into the exterior surface of said outer member.

3. A rubber grommet comprising a ring having a pair of axially spaced flanges and a central opening with an internal diameter that varies in the axial direction and is smallest in the radial zone of one of said flanges.

4. A rubber grommet comprising a collar having outwardly projecting flanges adjacent opposite ends and a central opening having internal ribs in the radial planes of said flanges.

5. For use with an apertured member and a member projecting through the aperture, a seal for the space between the members including a collar of deformable material adapted to be snugly fitted to the last mentioned member, a pair of spaced outward projections to receive therebetween the other member and means whereby said projections tightly grip said member comprising an internal projection on the collar in radial alinement with one of said outward projections, adapted for displacement to press said projections together.

6. A grommet of rubber or the like comprising a collar having a central opening and a pair of spaced peripheral flanges providing a peripheral grove therebetween, said central opening in the zone of the peripheral groove being larger in diameter than in the radial zones of the peripheral flanges, whereby upon installation the portions of smaller diameter move outwardly, bending the grommet in the zone of the grooves and bringing the flanges closer together to constrict said groove.

7. In a rubber grommet having a central opening to receive an inner member and a pair of spaced flanges to receive therebetween an outer member, means whereby the spacing of the flanges is varied upon the snug fitting of the grommet to the inner member, including an internal bead constricting the size of the opening in the radial zone of one of the flanges.

8. The combination with a panel having an opening and a member projecting through the opening, of a flexible collar member embracing and snugly fitting throughout its axial length, the surface of the member projecting through the opening, a pair of peripheral flanges projected from the collar member and crowded together against opposite sides of the panel around said opening by reason of a deformation of the flexible collar member, and means on one of the members in the radial zone of one of said flanges, effecting through the snug fit of the members, the displacement of the material of the collar for said deformation thereof.

9. A rubber grommet adapted to be expanded radially upon application to a part projected therethrough, said grommet including a pair of axially spaced flanges and a narrow neck connecting the flanges, with the opening through the grommet of smaller diameter in the region of at least one of said flanges than at the neck whereby the greater radial expansion in that region will crowd the flanges together.

GEORGE W. LAMPMAN.
GRANT F. COOPER.